United States Patent [19]

Krewalk, Sr.

[11] 4,063,263
[45] Dec. 13, 1977

[54] MANUALLY OPERATED SHUTTER ATTACHMENT

[75] Inventor: John J. Krewalk, Sr., West Hartford, Conn.

[73] Assignee: Criterion Manufacturing Company, Inc., West Hartford, Conn.

[21] Appl. No.: 677,269

[22] Filed: Apr. 15, 1976

[51] Int. Cl.² ............... G03B 9/26; G02B 7/02; G02B 5/22
[52] U.S. Cl. .................... 354/253; 350/256; 350/315; 354/295
[58] Field of Search ............... 354/295, 296, 253, 226, 354/122, 79; 350/19, 256, 257, 245, 246, 247, 315, 318

[56] References Cited

U.S. PATENT DOCUMENTS

| | | | |
|---|---|---|---|
| 2,184,831 | 12/1939 | Campbell | 350/247 |
| 2,199,998 | 5/1940 | Hutcheson, Jr. | 354/253 |
| 2,482,571 | 9/1949 | Arnold | 354/295 X |
| 2,496,408 | 2/1950 | Polance | 354/295 |
| 3,048,079 | 8/1962 | Dene et al. | 350/256 X |
| 3,590,714 | 7/1971 | Schops | 350/257 |
| 3,682,075 | 8/1972 | Profitt | 354/296 |
| 3,833,295 | 9/1974 | Bebb et al. | 350/315 X |
| 3,893,138 | 7/1975 | Frode | 354/286 |

FOREIGN PATENT DOCUMENTS

| | | | |
|---|---|---|---|
| 958,293 | 3/1950 | France | 354/253 |
| 646,038 | 11/1950 | United Kingdom | 350/318 |

Primary Examiner—Edna M. O'Connor

[57] ABSTRACT

A manually operated shutter attachment includes a pair of plate members each having an aperture therethrough secured in spaced parallel relationship with the apertures aligned. A blade member having a body portion and handle portion is pivotably mounted intermediate the plate members with the handle portion extending outwardly of the spacing therebetween whereby the body portion may be pivoted into and out of registration with the aligned apertures in the plate members by manual manipulation of the handle portion. Mounting means are provided on the outer surfaces of both plate members and extend about the apertures thereof for mounting the shutter attachment intermediate a telescope and camera and/or for securing a plurality of similar shutter attachments together. The body portion of the blade member may be opaque to provide a shutter or incorporate an optical filter or lens.

10 Claims, 9 Drawing Figures

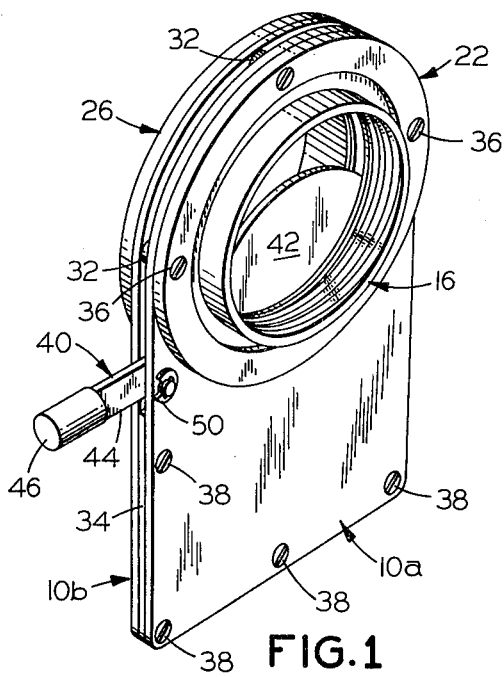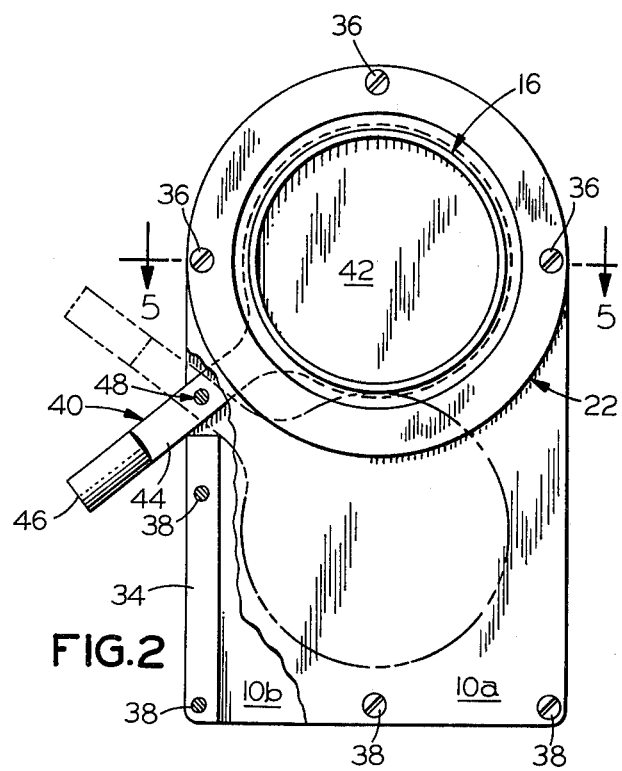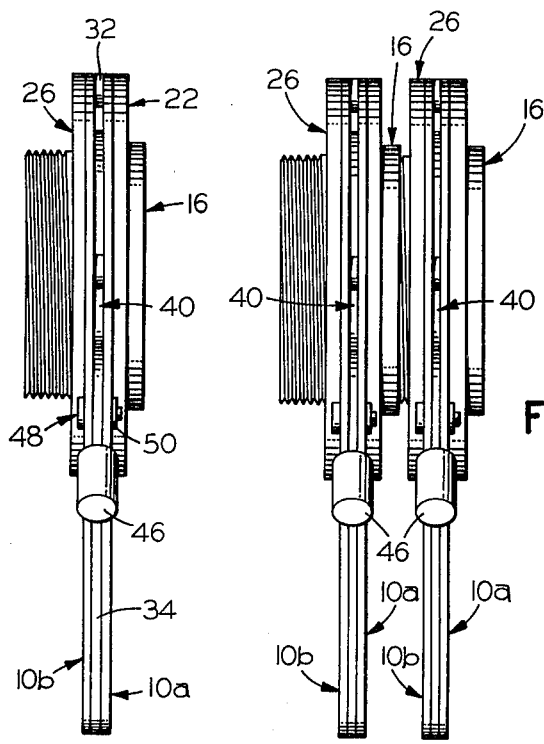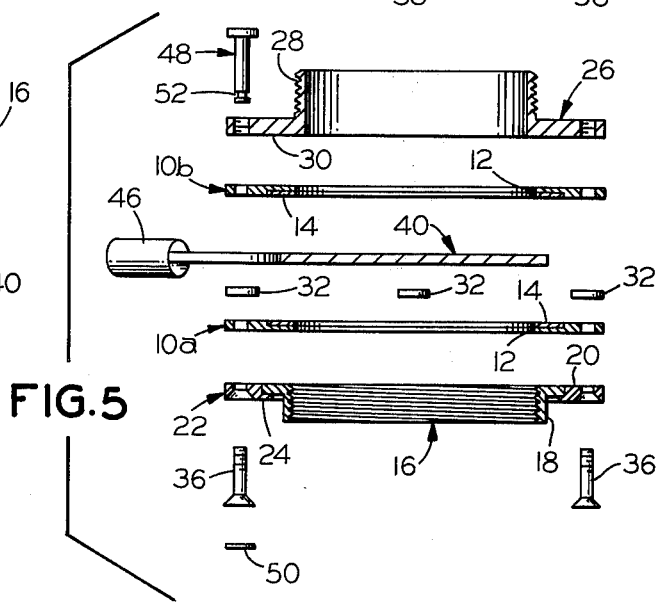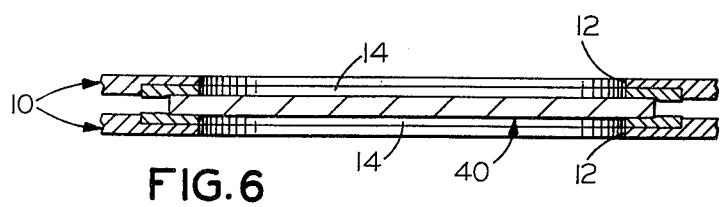

MANUALLY OPERATED SHUTTER ATTACHMENT

BACKGROUND OF THE INVENTION

In astrophotography using a single lens reflex cameral coupled to a telescope, a problem is often encountered due to the vibration resulting from the action of the camera shutter. To eliminate this vibration, an opaque element is generally placed in front of the telescope before and after exposure while maintaining the camera shutter in an open position. However, due to the length of telescope tubes and general inconvenience, this is frequently an impractical solution, and the astrophotographer must otherwise improvise to reduce and hopefully eliminate the vibration problem. Similarly, it is also inconvenient to interchange filters or auxiliary lenses used in conjunction with a telescope and camera. Moreover, it is often desirable, but quite difficult due to shutter vibration, to interrupt an exposure and subsequently reposition the telescope and camera to complete the photograph.

Accordingly, it is an object of the present invention to provide a novel manually operated shutter attachment adapted for mounting intermediate a telescope and camera which effectively avoids vibration problems attendant to closing the light path of the telescope to the film in the camera.

It is also an object of the present invention to provide such a shutter attachment whereby an optical filter or auxiliary lens may be mounted and easily removed from a position intermediate a telescope and coupled camera.

Another object is to provide such a shutter attachment whereby a plurality of separate element sets may be coupled to provide a series of optical elements and if desired a shutter.

Still another object is to provide such a shutter attachment which may be assembled readily from easily fabricated and relatively economical components and which is rugged and trouble free in operation.

SUMMARY OF THE INVENTION

It has now been found that the foregoing and related objects of the present invention are readily attained in a manually operated shutter attachment comprising a pair of plate members each having an aperture therethrough of lesser width than that of the plate members and being secured in spaced parallel relationship with the apertures aligned to provide a light passage through the shutter attachment. A blade member is slidably disposed between the plate members and has a body portion registrable with the apertures of the plate members. The blade member also has a handle portion extending outwardly of the space between the plate members for effecting manual movement of the body portion between a first position wherein the body portion registers with the apertures and a second position wherein it is removed from registration with the apertures. A first mounting member is secured to the outer surface of one of the plate members and extends about the aperture thereof for securing the shutter attachment to a camera or the like. A second mounting member is secured to the other surface of the other plate member and extends about the aperture thereof for securing the shutter to a telescope or the like.

In the preferred aspect, the apertures in the plate members are circular and of substantially equal diameter, the body portion of the blade member is opaque to close the light passage when in its first position, and the blade member is pivotably mounted intermediate the plate members.

The body portion of the blade member may include a lens or an optical filter, and if so the blade member preferably projects radially and axially from the periphery of the optical surfaces of the lens or filter whereby these optical surfaces are spaced apart from the plate members. A plurality of shutter attachments may be coupled to provide a series of lenses and filters and, if desired, a shutter.

BRIEF DESCRIPTION OF THE ILLUSTRATED EMBODIMENTS

FIG. 1 is a perspective view of a shutter attachment embodying the present invention with the blade member thereof in a partially opened position;

FIG. 2 is a front elevational view of the shutter attachment of FIG. 1 to an enlarged scale with a portion of one plate member broken away to show internal structure and the blade member shown in closed position in full line and in open position in phantom line;

FIG. 3 is a side elevational view of the shutter attachment;

FIG. 4 is a side elevational view of a pair of coupled shutter attachments;

FIG. 5 is an exploded sectional view along the line 5—5 of FIG. 2;

FIG. 6 is a sectional view of the plate members, blade member, and compressible members extending about the apertures of the plate members of FIG. 2 to an enlarged scale;

DETAILED DESCRIPTION OF THE ILLUSTRATED EMBODIMENTS

Figure 7:
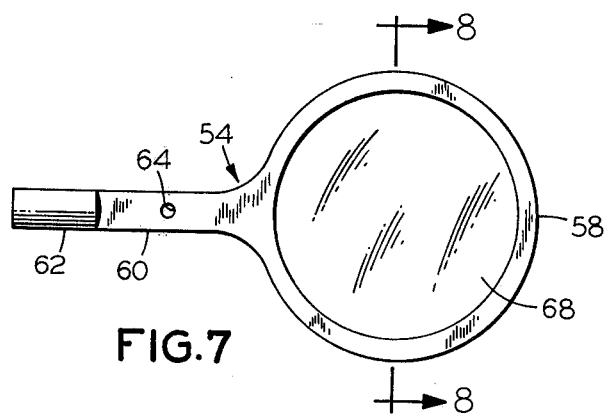
FIG. 7 is a front elevational view of another embodiment of the blade member showing a lens mounted therein.

Turning now to the attached drawings in detail and in particular to FIGS. 1-6 thereof, illustrated therein is a manually operated shutter attachment embodying the present invention comprising a pair of plate members generally designated by the numeral 10 disposed in spaced parallel relationship. Each plate member 10 is elongated with one end portion having a generally rectangular configuration and the other end portion an arcuate configuration, and each has a circular aperture 12 therethrough adjacent the arcuate end portion. A resilient annular member 14 is secured in a circular recess extending about each aperture 12 and, as shown best in FIG. 6, projects slighty beyond the adjacent surface of its corresponding plate member 10 to facilitate obtaining a light-tight seal as described hereinafter.

A mounting member generally designated by the numeral 16 is secured to the plate member 10a and comprises an internally threaded cylindrical portion 18 having a circular bore aligned with the aperture 12 of the plate member 10a and an annular flange portion 20 abutting the plate member 10a. An annular retainer member generally designated by the numeral 22 is seated against the plate member 10a and extends about the mounting member 16, the retainer member 22 having an inwardly projecting lip 24 over-lapping the flange portion 20 of the mounting member 16.

Secured to the plate member 10b is a mounting member generally designated by the numeral 26 which comprises an externally threaded cylindrical portion 28 having a circular bore aligned with the aperture 12 of the plate member 10b and an annular flange portion 30 abutting the plate member 10b.

The plate members 10a,b are disposed in spaced, parallel and aligned relationship and with a multiplicity of annular spacers 32 and an elongated stop member 34 in the spacing between the plate members 10. Threaded fasteners 36 extend through apertures in the retainer member 22, the plate member 10a, the spacers 32, the plate member 10b, and into threaded engagement with the flange portion 30 of the mounting member 26 to secure the arcuate end portions of the plate members 10 in spaced parallel relationship and also to secure the mounting members 16, 26 to the plate members 10a,b, respectively. Threaded fasteners 38 extend through apertures in the plate member 10a, spacers 32 and the stop member 34, and into threaded engagement with the plate member 10b to secure the rectangular end portions of the plate members 10 in spaced parallel relationship.

A blade member generally designated by the numeral 40 is slidably disposed intermediate the plate members 10, and comprises a generally circular opaque body portion 42 of larger diameter than the apertures 12 of the plate members 10 and an elongated handle portion 44 extending outwardly of the spacing between the plate members 10 adjacent the stop 34. A cylindrical grip 46 is secured to the free end of the handle portion 44 to facilitate gripping and manual manipulation of the blade member 40, and the blade member 40 is pivotally mounted by a pivot generally designated by the numeral 48 extending through aligned apertures in the plate members 10 and handle portion 44 adjacent an end of the stop member 34. The pivot 48 is retained in position by a snap ring 50 engaged in the groove 52 therein adjacent the end opposite the head thereof.

As seen in FIG. 2, the blade member 40 is pivotable between a first position (shown in full line) wherein the body portion 42 thereof registers with and blocks the light passage defined by the apertures 12 of the plate members 10 and a second position (shown in phantom line) wherein the body portion 42 is spaced to the side of the light passage. As shown best in FIG. 2, the stop member 34 functions to limit pivotal movement of the blade member 40 between the two extreme positions thereof. With reference to FIG. 6, the blade member 40 compresses the annular members 14 as it slides therebetween to provide a light-tight seal.

Figures 8, 9:
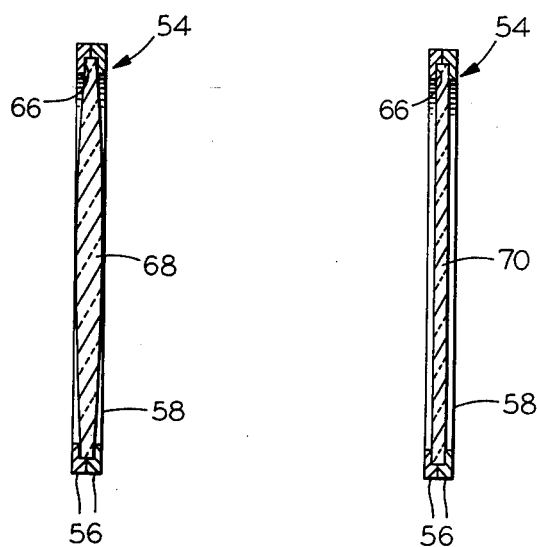
FIG. 8 is a sectional view along the line 8—8 of FIG. 7 drawn to an enlarged scale.
FIG. 9 is a view similar to that of FIG. 8 with a filter substituted for the lens shown therein.

Turning now to FIGS. 7-9, illustrated therein is another embodiment of blade member generally designated by the numeral 54 which may be interchanged with the blade member 40 described hereinbefore to augment the versatility of assemblies embodying the present invention. Since the blade member 54 is thicker than the blade member 40, interchanging requires spacers 32 and stop members 34 of different thickness. Alternatively, the blade members 40 and 54 may be dimensioned to have the same thickness.

The blade member 54 is a laminate of identically configured laminated elements 56 each having an annular mounting portion 58 and an elongated handle portion 60. The handle portion 60 has a cylindrical grip 62 secured to the free end thereof and an aperture 64 therethrough intermediate its length whereby the blade member 54 may be pivotally mounted as described hereinbefore with respect to the blade member 40. Inwardly opening channels 66 extend about the inner periphery of the mounting portions 58 at the interface between the laminated elements 56.

As shown in FIGS. 7 and 8, a lens 68 is supported in the mounting portion 58 of the blade member 54 with the peripheral edge portion of the lens 68 being seated in the channels 66. In FIG. 9, an optical filter 70 is mounted on the blade member 54 with the peripheral edge portion of the filter 70 being seated in the channels 66. The optical surfaces of the lens 68 and filter 70 are recessed from the outer surfaces of the mounting portion 58 so that pivotal movement of the blade member 54 will not damage the optical surfaces.

The shutter attachment is normally disposed intermediate and threadably secured to a telescope and a single lens reflex camera, the mounting members 16,26 being configured to permit this interconnection. Furthermore, any desired combination of the shutter, lens, and filter embodiments may be used as the mounting members 16,26 are threaded for interconnection (see FIG. 4). Any number of shutter attachments, especially the lens and filter embodiments, may also be mounted on an optical bench as desired whereby the optical elements are pivoted into and out of alignment with the optical axis of the bench.

The preferred construction material for the rigid elements of the shutter attachment is aluminum, although other metals, synthetic resins and ceramics of sufficient strength may be utilized. The annular members 14 are preferably felt or a suitable substitute.

The various elements of the shutter attachment are preferably configured and interconnected as described hereinbefore, but may have alternative configurations so long as the shutter attachment functions essentially as described. For example, the blade member may be generally rectangular and/or slidably disposed intermediate the plate members for reciprocating movement. The plate members may be integrally formed with a space therebetween in which the blade member is disposed, and other means than the stop member may be utilized to limit pivotal movement of the blade member. The mounting memebers may be similarly threaded or other than threaded if the mounting requirements so dictate, and the internally threaded mounting member may be integral with the retainer member therefor. Moreover, mounting members may be integral with the plate members.

Thus, it can be seen that the present invention provides a novel manually operated shutter attachment adapted for mounting intermediate a telescope and camera which effectively avoids vibration problems attendant to closing the light path of the telescope to the film in the camera. The shutter attachment may be utilized to position and easily remove an optical filter or auxiliary lens from intermediate a telescope and coupled camera, and a plurality of such shutter attachments may be coupled to provide a series of optical elements and, if desired, a shutter. Moreover, the shutter attachment may be assembled readily from easily fabricated and relatively economical components and is rugged and trouble free in operation.

Having thus described the invention, I claim:

1. A manually operated shutter attachment consisting essentially of:

A. a pair of plate members each having an aperture therethrough of lesser width than the width of said plate members, and means securing said plate members in spaced parallel relationship with said apertures being aligned to provide a ligh passage through said shutter attachment;
B. a manually movable blade member slidably disposed between said plate members and having a body portion registerable with said apertures of said plate members and a handle portion extending outwardly of said plate members for effecting manual movement of said body portion between a first position wherein said body registers with said apertures and a second position wherein said body portion is removed from registration with said apertures;
C. means slidably mounting said blade member between said plate members for movement between said first and second position;
D. a first mounting means on the outer surface of one of said plate members extending about the aperture thereof and adapted for securing said shutter attachment to a camera or the like; and
E. a second mounting means on the outer surface of the other of said plate members extending about the aperture thereof and adapted for securing said shutter attachment to a telescope or the like, said attachment comprising an integrated independent assembly assemblable and removable as a unit from an associated telescope and camera.

2. The manually operated shutter attachment of claim 1 wherein said apertures in said plate members are circular and of substantially equal diameter.

3. The manually operated shutter attachment of claim 1 wherein said body portion of said blade member is opaque to close said light passage when in said first position.

4. The manually operated shutter attachment of claim 1 wherein said means slidably mounting said blade member comprises pivot means adjacent said apertures of said plate members pivotably mounting said blade members for pivotal movement between said first and second positions.

5. The manually operated shutter attachment of claim 1 wherein said apertures in said plate members are circular, said body portion of said blade member is opaque, and said means slidably mounting said blade member comprises pivot means adjacent said apertures of said plate members for pivotally mounting said blade member for pivotal movement between said first and second positions.

6. The manually operated shutter attachment of claim 1 further including a cooperatively assembled second set of second plate members, second blade member, slidable mounting means, and first and second mounting means, one of said mounting means of said second set being coupled to on of said mounting means of the first mentioned set with said light passages thereof in alignment.

7. The manually operated shutter attachment of claim 6 wherein said body portion of said second mentioned blade member includes a lens.

8. The manually operated shutter attachment of claim 7 wherein said second mentioned blade member projects radially and axially from the periphery of the optical surfaces of said lens whereby said optical surfaces are spaced from said second mentioned plate members.

9. The manually operated shutter attachment of claim 6 wherein said body portion of said second mentioned blade member includes an optical filter.

10. The manually operated shutter attachment of claim 9 wherein said second mentioned member projects outwardly beyond the optical surfaces of said filter about the periphery thereof whereby said optical surfaces are spaced from said second mentioned plate members.

* * * * *

UNITED STATES PATENT AND TRADEMARK OFFICE
CERTIFICATE OF CORRECTION

PATENT NO. : 4,063,263
DATED : December 13, 1977
INVENTOR(S) : John J. Krewalk, Sr.

It is certified that error appears in the above-identified patent and that said Letters Patent are hereby corrected as shown below:

Column 5, line 1, "ligh" should be -- light --;

Column 5, line 9, after "body" add -- portion --;

Column 6, line 8, "pivotally" should be -- pivotably --;

Column 6, line 32, after "mentioned" add -- blade --.

*Signed and Sealed this*

*Twenty-third* Day of *May 1978*

[SEAL]

Attest:

RUTH C. MASON
*Attesting Officer*

LUTRELLE F. PARKER
*Acting Commissioner of Patents and Trademarks*